(12) United States Patent
Joulia et al.

(10) Patent No.: US 11,976,570 B2
(45) Date of Patent: May 7, 2024

(54) FUSED SAND-RESISTANT AERONAUTICAL PART

(71) Applicant: SAFRAN, Paris (FR)

(72) Inventors: Aurélien Joulia, Moissy-Cramayel (FR); Benjamin Dominique Roger Joseph Bernard, Joue-les-Tours (FR); Luc Patrice Bianchi, Moissy-Cramayel (FR)

(73) Assignee: SAFRAN, Paris (FR)

( * ) Notice: Subject to any disclaimer, the term of this patent is extended or adjusted under 35 U.S.C. 154(b) by 570 days.

(21) Appl. No.: 17/414,208

(22) PCT Filed: Dec. 20, 2019

(86) PCT No.: PCT/FR2019/053268
§ 371 (c)(1),
(2) Date: Jun. 15, 2021

(87) PCT Pub. No.: WO2020/128401
PCT Pub. Date: Jun. 25, 2020

(65) Prior Publication Data
US 2022/0065114 A1    Mar. 3, 2022

(30) Foreign Application Priority Data
Dec. 20, 2018   (FR) ...................... 1873692

(51) Int. Cl.
*F01D 5/28* (2006.01)
*C04B 41/50* (2006.01)

(52) U.S. Cl.
CPC .......... *F01D 5/288* (2013.01); *C04B 41/5035* (2013.01); *C04B 41/5042* (2013.01);
(Continued)

(58) Field of Classification Search
CPC ..... F01D 5/288; F01D 5/284; C04B 41/5035; C04B 41/5042; C04B 41/5045;
(Continued)

(56) References Cited

U.S. PATENT DOCUMENTS

| 2010/0159151 A1 | 6/2010 | Kirby |
| 2017/0022113 A1 | 1/2017 | Opila |

(Continued)

FOREIGN PATENT DOCUMENTS

| CN | 108138329 A | 6/2018 |
| EP | 3 178 799 A1 | 6/2017 |

OTHER PUBLICATIONS

Huimin Xiang, et al., "Crystal structure, mechanical and thermal properties of Yb4Al2O9: A combination of experimental and theoretical investigations", Journal of the European Ceramic Society, 2017, vol. 37, 2491-2499.

(Continued)

*Primary Examiner* — Andrew J. Oyer
(74) *Attorney, Agent, or Firm* — Sughrue Mion, PLLC

(57) ABSTRACT

The invention relates to an aeronautical part, such as, for example, a turbine blade or a distributor vane, which is used in aeronautics, comprising at least one reactive layer adapted to react with at least one CMAS compound, the reactive layer at least partially covering the environmental barrier, characterized in that the material of the reactive layer comprises at least one oxide of the formula $A'4-xA''xB'2-yB''yO11-\delta$, $A'$ being selected from a rare earth, yttrium and scandium, $A''$ being selected from a rare earth, yttrium, scandium and aluminum, $B'$ being selected from tantalum and niobium, $B''$ being selected from tantalum, niobium, titanium, zirconium, hafnium, aluminum and cesium, (Continued)

wherein x and y are real numbers between 0 and 2 and δ is a real number between −1 and 2 and preferably between −1 and 1.

10 Claims, 3 Drawing Sheets

(52) U.S. Cl.
    CPC .......... *C04B 41/5045* (2013.01); *F01D 5/284* (2013.01); *F05D 2300/211* (2013.01); *F05D 2300/2112* (2013.01); *F05D 2300/611* (2013.01)

(58) Field of Classification Search
    CPC ....... F05D 2300/211; F05D 2300/2112; F05D 2300/611; Y02T 50/60; C23C 30/00; C23C 4/11
    See application file for complete search history.

(56) References Cited

U.S. PATENT DOCUMENTS

2019/0024243 A1    1/2019  Podgorski et al.
2020/0400028 A1*  12/2020  Hazel ................... C23C 28/042

OTHER PUBLICATIONS

E.J. Opila, "Investigation of Rare Earth (RE) Titanates as Potential Environmental Barrier Coating (EBC) Constituents for Mitigation of CMAS Attack", XXVI International Materials Research Congress, 2017.

Preliminary search report for French application 1873692 dated Oct. 31, 2019.

International search report for PCT/FR2019/053268 dated May 14, 2020.

\* cited by examiner

[Fig. 1]
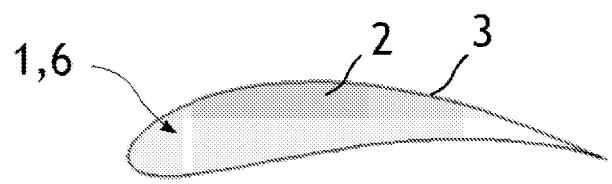
[Fig. 2]
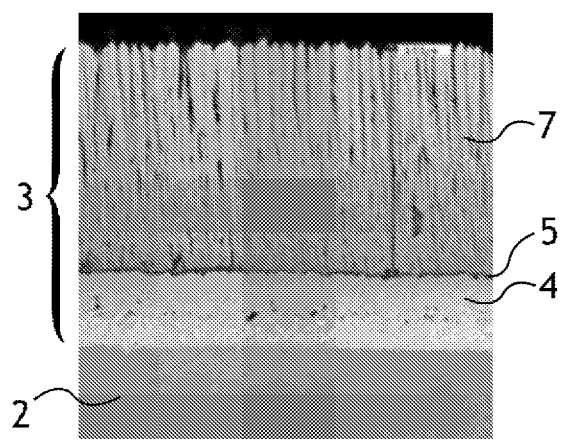
[Fig. 3]
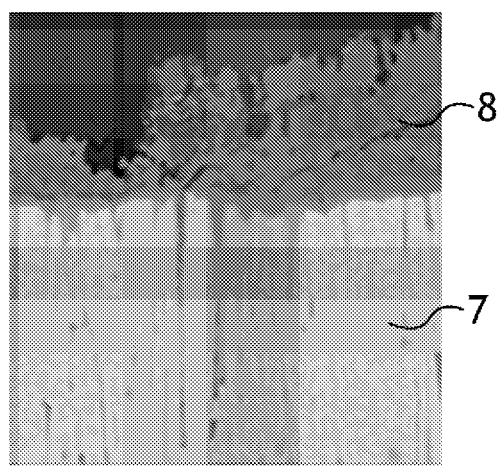

[Fig. 4]
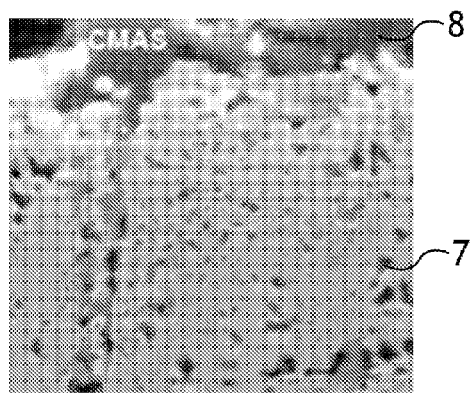
[Fig. 5]
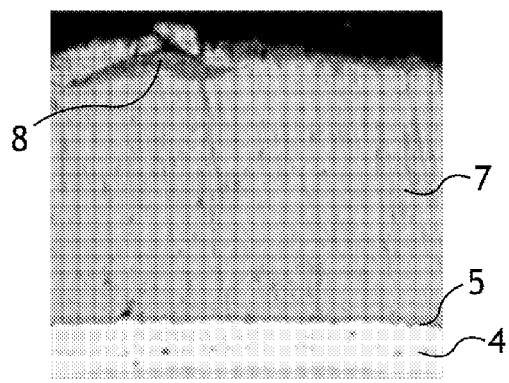
[Fig. 6]
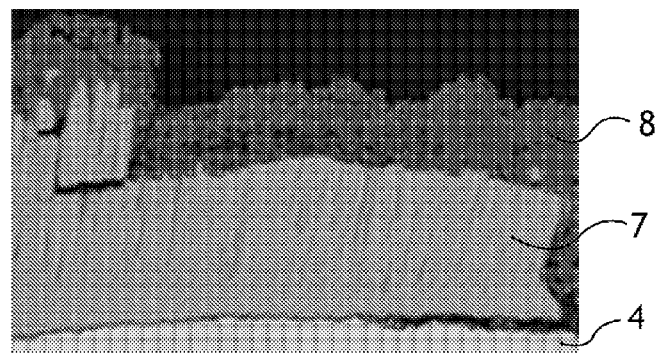

[Fig. 7]
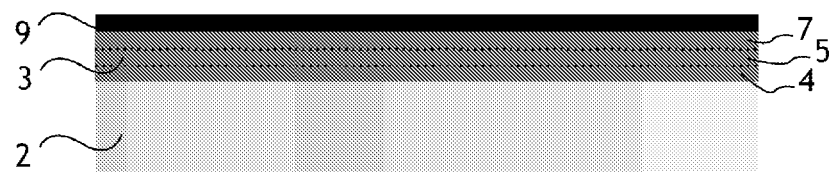
[Fig. 8]
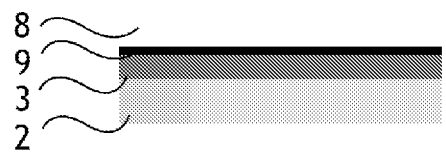
[Fig. 9]
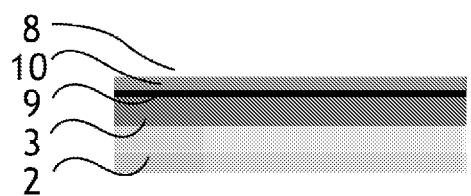

FUSED SAND-RESISTANT AERONAUTICAL PART

CROSS-REFERENCE TO RELATED APPLICATIONS

This application is a National Stage of International Application No. PCT/FR2019/053268 filed Dec. 20, 2019, which claims priority under U.S.C. § 119(a) to French Patent Application No. 1873692 filed Dec. 20, 2018, the entire contents of each of which being herein incorporated by reference in their entireties.

FIELD OF THE INVENTION

The invention relates to an aeronautical part, such as a turbine blade or a nozzle vane for example, used in aeronautics.

STATE OF THE ART

In a turbojet engine, the exhaust gases generated by the combustion chamber can reach high temperatures, exceeding 1200° C. or even 1600° C. A part of the turbojet engine, in contact with these exhaust gases, such as a turbine blade for example, must therefore be able to retain its mechanical properties at these high temperatures. In addition, corrosion and/or oxidation of the substrate of the part is promoted by these high temperatures.

To this end, it is known to protect the part against excessive temperatures, oxidation and/or corrosion by covering it with an environmental barrier.

FIG. 1 schematically illustrates a cross-section of a known turbine part 1, for example a turbine blade 6 or a nozzle vane. The part 1 comprises a substrate 2, for example of a single crystal metal superalloy. The substrate 2 is covered with a coating, for example an environmental barrier 3.

FIG. 2 schematically illustrates a cross-section of the known turbine part 1. The part 1 comprises the substrate 2 covered by the environmental barrier 3. The environmental barrier 3 typically comprises a sublayer 4, a protective layer and a thermally insulating layer 7. The sublayer 4 covers the substrate 2. The sublayer 4 is covered by the protective layer 5, formed for example by oxidation of the sublayer 4. The protective layer 5 serves to protect the substrate 2 from corrosion and/or oxidation. The thermally insulating layer 7 covers the protective layer 5. The thermally insulating layer 7 may be made of ceramic, for example yttriated zirconia.

The environmental barrier 3 degrades particularly when exposed to sand particles (for example inorganic compounds such as silica) or more generally to oxides of calcium, magnesium, aluminum and/or silicon, the acronym for which is CMAS. The CMAS have a lower melting temperature than the materials of the environmental barrier 3 and can thus infiltrate in a molten state into the environmental barrier 3 during use of the part 1, particularly into the interstices of the environmental barrier 3. CMAS infiltration into the environmental barrier 3 causes the environmental barrier 3 to stiffen, which may lead to mechanical failure of the environmental barrier 3 under the operating conditions of the turbine. CMAS infiltration also leads to dissolution of the thermally insulating layer 7 by chemical reaction between the one or more CMAS and the thermally insulating layer 7.

With reference to FIG. 3 and FIG. 4, one or more CMAS compounds 8 may infiltrate into the interstices of the thermally insulating layer 7, causing the thermally insulating layer 7 to stiffen.

With reference to FIG. 5 and FIG. 6, the thermally insulating layer 7 may be chipped and broken by insertion of CMAS compounds 8 during use of the part 1, and for example be detached from the sublayer 4.

Levi et al. (Levi, C. G., Hutchinson, J. W., Vidal-Sétif, M. H., Et Johnson, C. A. (2012). Environmental degradation of thermal-barrier coatings by molten deposits. *MRS bulletin*, 37(10), 932-941) describes the use of a part 1 coated with rare-earth zirconate, such as $Gd_2Zr_2O_7$ (GZO). On contact with CMAS, the rare-earth zirconate is dissolved, and precipitates on the one hand into a fluorite phase $Zr(Gd,Ca)O_x$ and on the other hand into a very stable apatite phase $Ca_2Gd_8(SiO_4)_6O_2$. These precipitations lead to the blocking of the interstices present between the different GZO columns and/or the thermally insulating layer 7 and to the formation of a diffusion barrier, which slows down the dissolution rate of the GZO columns and/or the thermally insulating layer 7.

On the other hand, the precipitation of molten CMAS, described by Levi et al., clogs the interstices when the CMAS has entered the interstices of the GZO and/or the thermally insulating layer 7, leading to a deterioration of the mechanical properties of the environmental layer 3.

For example, a reactive layer of lanthanum zirconate ($La_2Zr_2O_7$) can also be deposited on a turbine part. When the reactive layer is brought into contact with molten CMAS, part of the reactive layer is dissolved, and the reaction between the reactive layer and the CMAS produces an apatite phase of $Ca_2La_8(SiO_4)_6O_2$. Cracks appear in the reactive layer, resulting in areas of the part that are not protected from the CMAS.

US 2016/011589 describes a reactive layer comprising an anti-CMAS coating comprising an oxide having an orthorhombic lattice structure, for preventing infiltration of molten CMAS into the environmental barrier.

DISCLOSURE OF THE INVENTION

One aim of the invention is to increase the resistance of an aeronautical part to CMAS compounds.

Another aim of the invention is to provide a coating allowing an aeronautical part to resist CMAS compounds different from a known coating of the prior art.

Another aim of the invention is to provide a coating that allows an aeronautical part to resist CMAS compounds and that has adjustable mechanical and/or chemical properties.

These aims are achieved in the context of the present invention by virtue of an aeronautical part, comprising:
  a substrate,
  an environmental barrier comprising at least one layer selected from a thermally insulating layer, a sublayer suitable for promoting adhesion between the substrate and a thermally insulating layer and a protective layer suitable for protecting the substrate from oxidation and/or corrosion, the environmental barrier at least partially covering the substrate,
  at least one reactive layer suitable for reacting with at least one CMAS compound selected from a calcium oxide, a magnesium oxide, an aluminum oxide and a silicon oxide, the reactive layer at least partially covering environmental barrier
  characterized in that the material of the reactive layer comprises at least one oxide of formula $A'_{4-x}A''_xB'_{2-y}B''_yO_{11-\delta}$, A' being selected from a rare earth, yttrium and scandium, A" being selected from a rare earth, yttrium, scandium and aluminum, B' being selected from tantalum and niobium, B" being selected from tantalum, niobium, titanium, zirconium, hafnium, aluminum and cesium, x and y being real numbers between 0 and 2 and 6 being a real number between −1 and 2, and preferentially between −1 and 1.

The invention is advantageously supplemented by the following features, taken individually or in any technically possible combination thereof:

the oxide predominantly has a cubic lattice in volume,
the oxide has a rare-earth atomic fraction of between 18% and 24%,
A' and A" are the same element, A' and A" being selected from a rare earth, scandium and yttrium and, preferentially, A' and A" are an element selected from the lanthanides,
B' and B" are the same element, B' and B" being selected from tantalum and niobium,
the oxide is suitable for forming at least one precipitate comprising apatite and/or anorthite on contact with a CMAS compound selected from a calcium oxide, a magnesium oxide, an aluminum oxide and a silicon oxide,
the oxide predominantly has a cubic crystal lattice,
the oxide predominantly has a crystal lattice with a space group of the type Fm$\bar{3}$m,
the reactive layer directly overlies a layer selected from the thermally insulating layer and the protective layer,
the reactive layer has a thickness of between 5 μm and 500 μm,
the oxide is suitable for forming a product in a first reaction with the CMAS compound, said product being suitable for forming an apatite phase in a second reaction with the CMAS compound and/or with another product of the first reaction,
the reactive layer also comprises at least one complementary oxide selected from yttriated zirconia, $Al_2O_3$, $Y_2O_3$—$ZrO_2$—$Ta_2O_5$ and an oxide of formula $C_2D_2O_7$, wherein C is selected from a rare earth and yttrium, and D is selected from zirconia and silicon,
the average volume fraction of said oxide in the reactive layer varies with increasing distance from the substrate,
the reactive layer comprises at least 50% by volume of said oxide.

The invention also relates to a process for protecting an aeronautical part, for example a turbine part, comprising a step of depositing, on the part, a reactive layer suitable for reacting with at least one CMAS compound selected from a calcium oxide, a magnesium oxide, an aluminum oxide and a silicon oxide, characterized in that the material of the reactive layer comprises an oxide of formula $A'_{4-x}A''_xB'_{2-y}B''_yO_{11-\delta}$, A' being selected from a rare earth and yttrium, A" being selected from a rare earth, yttrium, aluminum and scandium, B' being selected from tantalum and niobium, B" being selected from tantalum, niobium, titanium, zirconium, hafnium and cesium, x and y being real numbers between 0 and 2 and 6 being a real number between −1 and 2, and preferentially between −1 and 1.

The process is advantageously supplemented by the following features, taken individually or in any technically possible combination thereof:

the part comprises a substrate, an environmental barrier comprising at least one layer selected from a thermally insulating layer, a sublayer suitable for promoting adhesion between the substrate and the thermally insulating layer, and a protective layer suitable for protecting the substrate from oxidation and/or corrosion, the environmental barrier at least partially covering the substrate, the deposited reactive layer at least partially covering the environmental barrier, the reactive layer being deposited on the environmental barrier, the reactive layer is deposited by a method selected from atmospheric-pressure plasma spraying, suspension plasma spraying, solution plasma spraying, high-velocity flame spraying of powder, electron beam evaporation, vapor deposition, sol-gel and electrophoresis.

DESCRIPTION OF THE FIGURES

Other features, aims and advantages of the invention will emerge from the following description, which is purely illustrative and non-limiting, and which should be read in conjunction with the appended drawings in which:

FIG. 1 schematically illustrates a cross-section of a turbine part, for example a turbine blade or a nozzle vane, FIG. 2 is a microphotograph illustrating a cross-section of substrate covered with an environmental barrier, FIG. 3 is a microphotograph illustrating the insertion of molten CMAS compounds into the environmental barrier, FIG. 4 is a microphotograph illustrating the insertion of molten CMAS compounds into the environmental barrier, FIG. 5 is a microphotograph illustrating the breakdown of an environmental barrier, FIG. 6 is a microphotograph illustrating the breakdown of an environmental barrier, FIG. 7 schematically illustrates a turbine part comprising a coating according to the invention, FIG. 8 schematically illustrates a turbine part comprising a coating according to the invention, in contact with CMAS compounds, FIG. 9 schematically illustrates a turbine part comprising a coating according to the invention.

Throughout the figures, similar elements have identical reference marks.

DEFINITIONS

The term "superalloy" refers an alloy that, at high temperature and high pressure, has very good resistance to oxidation, corrosion, creep and cyclic stresses (particularly mechanical or thermal stresses). Superalloys have a particular application in the manufacture of parts used in aeronautics, for example turbine blades, because they constitute a family of high-strength alloys that can work at temperatures relatively close to their melting points (typically 0.7 to 0.8 times their melting temperatures).

A superalloy may have a two-phase microstructure comprising a first phase (referred to as "γ phase") forming a matrix, and a second phase (referred to as "γ' phase") forming precipitates hardening in the matrix. The coexistence of these two phases is referred to as y-y' phase.

The "base" of the superalloy refers to the main metal component of the matrix. In most cases, superalloys comprise an iron, cobalt or nickel base, but sometimes also a titanium or aluminum base. The base of the superalloy is preferentially a nickel base.

"Nickel-base superalloys" have the advantage of offering a good compromise between oxidation resistance, high-temperature fracture resistance and weight, which justifies their use in the hottest parts of turbojet engines.

Nickel-base superalloys consist of a γ phase (or matrix) of the face-centered cubic austenitic γ-Ni type, optionally containing substitutional solid solution additives α (Co, Cr, W, Mo), and a γ' phase (or precipitates) of the γ'—Ni₃X type, with X=Al, Ti or Ta. The γ' phase has an ordered L12 structure, derived from the face-centered cubic structure, consistent with the matrix, i.e., having an atomic lattice very close to it.

The term "volume fraction" refers to the ratio of the volume of an element or group of elements to the total volume.

"Space group" of a crystal refers to the set of symmetries of a crystal structure, i.e., the set of affine isometries leaving the structure invariant. It is a group in the mathematical sense of the term.

DETAILED DESCRIPTION OF THE INVENTION

With reference to FIG. 7, a part 1 comprises a substrate 2. The substrate 2 may preferentially be a superalloy substrate, and preferably a nickel-base superalloy as described above. The substrate 2 is at least in partially covered by an environmental barrier 3. The environmental barrier 3 may comprise, in a known manner, and as illustrated in FIG. 1, a sublayer 4 extending between the substrate 2 and the other layers of the environmental barrier 3, directly overlying the substrate 2, suitable for promoting adhesion between the substrate 2 and the other layers of the environmental barrier 3. The environmental barrier 3 may also comprise a protective layer 5, suitable for protecting the substrate 2 from oxidation and/or corrosion, and directly covering the sublayer 4. The protective layer 5 is for example formed by oxidation of the sublayer 4. It may for example be made of alumina. The environmental barrier 3 may also comprise a thermally insulating layer 7, directly covering the protective layer 5.

The part 1 also comprises a reactive layer 9 suitable for reacting with at least one CMAS compound 8. The CMAS compound 8 may be a calcium oxide, a magnesium oxide, an aluminum oxide and/or a silicon oxide. The reactive layer 9 at least partially covers the environmental barrier 3. It may directly cover at least one of the layers of the environmental barrier 3, selected from the protective layer 5 and the thermally insulating layer 7. Different reactive layers 9 may also cover different layers of the environmental barrier 3. The embodiment illustrated in FIG. 1 comprises at least one reactive layer 9 covering all of the layers of the environmental barrier 3. The reactive layer 9 may have a thickness between 5 μm and 500 μm, so as to allow the formation of an apatite phase upon contact with a CMAS compound 8.

The material of the reactive layer 9 comprises an oxide of formula $A'_{4-x}A''_xB'_{2-y}B'''_yO_{11-\delta}$, A' being selected from a rare earth and yttrium, A" being selected from a rare earth, yttrium, aluminum and scandium, B' being selected from tantalum and niobium, B" being selected from tantalum, niobium, titanium, zirconium, hafnium, aluminum and cesium, x and y being real numbers between 0 and 2 and 6 being a real number between −1 and 2, and preferentially between −1 and 1. This formula allows the oxide of the reactive layer 9 (hereinafter "the oxide") to predominantly have a cubic lattice in volume. Thus, the material of the reactive layer 9 comprises a volume fraction of rare earth and/or yttrium high enough to allow a rapid precipitation of the molten CMAS compound(s), and to avoid their introduction into interstices present in the environmental barrier 3. Concomitantly, the oxide, by virtue of its composition, predominantly has a cubic lattice in volume, which allows it to have a high atomic fraction of rare earths and/or yttrium.

Table 1 comprises the various elements A', A", B' and B" which can be selected for the oxide.

TABLE 1

| A' | A" | B' | B" |
|---|---|---|---|
| Sc, Y, La, Ce, Pr, Nd, Pm, Sm, Eu, Gd, Tb, Dy, Ho, Er, Tm, Yb, Lu | Sc, Y, La, Ce, Pr, Nd, Pm, Sm, Eu, Gd, Tb, Dy, Ho, Er, Tm, Yb, Lu, Al | Ta, Nb | Ta, Nb, Ti, Zr, Hf, Al, Ce |

Thus, the oxide material may have a rare earth and/or yttrium atomic fraction between 18% and 24%. This range of rare earth and/or yttrium atomic fraction, higher than that of $Gd_2Zr_2O_7$ for example, allows the material of the reactive layer 9 to exhibit faster reaction kinetics with the CMAS compound(s) 8 than materials described in the prior art (for example $Gd_2Zr_2O_7$). Thus, the molten CMAS compound(s) 8 in contact with the reactive layer 9 are immobilized more quickly, or slowed down by a production of an apatite phase, thickening and/or solidifying the reactive CMAS compound 8 at the interface with the environmental barrier 3, and avoiding contact between the CMAS compound(s) 8 and other parts of the environmental barrier 3.

Advantageously, the elements A' and A" may be different. Thus, the reactivity of the oxide with respect to the at least one CMAS 8 can be increased by the formation of different phases, including at least one apatite phase, for example of the general formula $Ca_2RE_8(SiO_4)_6O_2$, RE being a rare earth or yttrium. $Y_2Gd_2Ta_2O_{11}$ and $Y_2Yb_2Ta_2O_{11}$ are examples of compositions used for the oxide, wherein A' and A" are different elements.

Advantageously, the elements B' and B" can be different. Thus, the mechanical properties of the oxide can be adjusted. For example, the mechanical strength can be higher. $Gd_4Ta_{1.5}Zr_{0.5}O_{10.75}$, $Gd_4Nb_{1.5}Zr_{0.5}O_{10.75}$, $La_4Ta_{1.5}Hf_{0.5}O_{10.75}$ are examples of compositions used for the oxide, wherein B' and B" are different elements.

Advantageously, the elements A', A", B' and B" are selected so as to allow the formation of an apatite phase and an anorthite phase when the oxide and a CMAS compound 8 are in contact. The apatite phase and the anorthite phase are then blocking or sealing with respect to the CMAS compounds 8. In addition, the reactivity of the oxide with respect to the CMAS compounds 8 may be increased. Preferentially, A' and/or B' are aluminum. Due to the volume fraction of aluminum in the reactive layer 9, the CMAS compound 8 can be locally enriched in aluminum oxide and be more easily crystallizable. $La_3AlTaAlO_{10}$, $Gd_{3.1}Al_{0.9}Ta_{1.7}Ti_{0.3}O_{10.85}$ are examples of compositions that can form both an apatite phase and an anorthite phase in contact with a CMAS compound 8.

Advantageously, the elements A', A", B' and B" are selected so as to allow the formation of a secondary oxide, resulting from the reaction between the oxide and the CMAS compound(s) 8. The secondary oxide formed is reactive with by-products of the reaction between the oxide and the CMAS compound(s) 8, such as $Ta_2O_5$ or $Nb_2O_5$, $ZrO_2$, CaO, MgO, $HfO_2$, $CaTiO_3$ and $MgTiO_3$, and suitable for forming an apatite phase upon reaction with these by-products. For example, an oxide of the general formula $A_4B_2O_{11-\delta}$ (A being selected from Y, La and Lu, and B being selected from Ta and Nb) is suitable for forming a secondary oxide of the general formula $A_6B_4O_{19}$. The atomic fraction of reactive cation (i.e., of compound A) in the secondary oxide is substantially equal to 20.69%.

The elements A' and A" may be the same element A: the oxide of the reactive layer 9 may be described by the formula $A_4B'_{2-y}B''_yO_{11-\delta}$. The elements of the oxide are selected from the elements described in Table 2.

TABLE 2

| A | B' | B" |
|---|----|----|
| Sc, Y, La, Ce, Pr, Nd, Pm, Sm, Eu, Gd, Tb, Dy, Ho, Er, Tm, Yb, Lu | Ta, Nb | Ta, Nb, Ti, Zr, Hf, Al, Ce |

Thus, the atomic fraction of rare earth and/or yttrium and/or scandium and/or aluminum can be increased compared with known oxides, due to the structure of the oxide.

The elements B' and B" may also be the same element B, selected from Ta and Nb. In this case, the general formula of the oxide is $A'_{4-x}A''_xB_2O_{11-\delta}$.

Advantageously, and in order to simplify the manufacture of the reactive layer 9, the same elements can be selected on the one hand for A' and A" and on the other hand for B' and B". In this case, the oxide can be described by the formula $A_4B_2O_{11}$.

The reactive layer 9 may also comprise at least one complementary oxide selected from yttriated zirconia, $Al_2O_3$, $Y_2O_3$—$ZrO_2$—$Ta_2O_5$ and an oxide of formula $C_2D_2O_7$, wherein C is selected from a rare earth and yttrium and D is selected from zirconia and silicon. The one or more complementary oxides are known to exhibit properties to increase the life of parts exposed to CMAS compounds.

The complementary oxide(s) exhibit properties different from the oxide, such as the reaction kinetics with the CMAS compound and/or the reaction products with the CMAS compound. The properties of the oxide and the complementary oxide can thus be combined in the reactive layer 9.

The reactive layer 9 may also have an average volume fraction of oxide that varies with increasing distance from the substrate 2. Thus, the reactive layer 9 has a gradient of volume fraction of oxide. A reactive layer 9 having an oxide gradient may for example be manufactured by depositing a succession of reactive sublayers, each sublayer having a different volume fraction of oxide.

Another aspect of the invention is a process for protecting a part from molten sand(s). The process comprises a step of depositing the reactive layer 9 as described above, on a part 1. After deposition, the part 1 comprises the reactive layer 9. The reactive layer 9 may be deposited directly on the substrate 2 of the part 1, for example a superalloy substrate 2, or on one or more layers of an environmental barrier 3. The deposition of the reactive layer 9 may be performed on at least one of the layers forming the environmental barrier 3, and preferentially on the thermally insulating layer 7. Thus, and unlike known parts, the part 1 comprising the reactive layer 9 deposited on the thermally insulating layer 7 has sufficient reactivity with the CMAS compound(s) 8 to produce at least one apatite phase before the insertion of the molten CMAS compound(s) 8 into the interstices of the thermally insulating layer 7, and thus avoid or limit this insertion. In this way, it is more difficult for the CMAS compound(s) 8 to access the surface of the environmental barrier 3, and their effect on the breakdown of the environmental barrier 3 is limited.

EXAMPLES

Example 1: Reaction Between a Liquid CMAS and a Reactive Layer of $Gd_4Nb_{1.5}Zr_{0.5}O_{10.75}$ With reference to FIG. 8, a reactive layer 9 comprising the oxide $Gd_4Nb_{1.5}Zr_{0.5}O_{10.75}$ is subjected to chemical attack by a molten CMAS 8. The reactive layer 9 is deposited by spark plasma sintering (SPS).

With reference to FIG. 9, after a reaction time for example greater than 5 min, preferentially greater than 1 minute, a part of the reactive layer 9 is dissolved by the CMAS compound 8, and an apatite phase $Ca_2Gd_8(SiO_4)_6O_2$ impervious to the molten CMAS 8 is formed between the reactive layer 9 and the molten CMAS 8. The $Ca_2Gd_8(SiO_4)_6O_2$ layer is also impermeable to other reaction products (by-products) between the reactive layer 9 and the CMAS compounds 8. The $Ca_2Gd_8(SiO_4)_6O_2$ layer is also able to produce secondary phases, allowing the reactive layer 9 to be protected. The environmental barrier 3 does not have any cracks. Indeed, the reservoir of compound cations A, i.e., A' and A" when A' and A" are the same element, makes it possible to form a tight layer and thus to limit the penetration depth, compared with the use of a known reactive layer such as $La_2Zr_2O_7$.

Example 2: Reaction Between a Liquid CMAS and a Reactive Layer of $Y_2Gd_2Ta_2O_{11}$ With reference to FIG. 8, a reactive layer 9 comprising the oxide $Y_2Gd_2Ta_2O_{11}$ is subjected to chemical attack by a molten CMAS 8. The reactive layer 9 is deposited by suspension plasma spraying (SPS).

With reference to FIG. 8b, after a reaction time for example greater than 5 min, preferentially greater than 1 minute, part of the reactive layer 9 is dissolved by the CMAS compound 8, and two apatite phases $Ca_2Gd_8(SiO_4)_6O_2$ and $Ca_2Y_6(SiO_4)_6O_2$ impervious to the molten CMAS 8 are formed between the reactive layer 9 and the molten CMAS 8. The environmental barrier 3 has no cracks. Indeed, the reservoir of Y and Gd cations makes it possible to form two tight layers in large quantity and thus to limit the penetration depth, compared with the use of a known reactive layer such as $La_2Zr_2O_7$. Indeed, six $Y^{3+}$ cations are sufficient to preferentially form the apatite $Ca_4Y_6(SiO_4)_6O$ whereas eight Gd' cations are necessary to form the apatite of more complex crystallographic structure $Ca_2Gd_8(SiO_4)_6O_2$. In addition, the formation of two different layers as a reaction product between the reactive layer 9 and the CMAS 8 increases the kinetics of this reaction.

Example 3: Reaction Between a Liquid CMAS and a Reactive Layer of $Gd_{3.1}Al_{0.9}Ta_{1.7}Ti_{0.5}O_{10.85}$ With reference to FIG. 9, a reactive layer 9 comprising the oxide $Gd_{3.1}Al_{0.9}Ta_{1.7}Ti_{0.5}O_{10.85}$ is subjected to chemical attack by a molten CMAS 8. The reactive layer 9 is deposited by suspension plasma spraying (SPS).

With reference to FIG. 8b, after a reaction time for example greater than 5 min, preferentially greater than 1 min, a part of the reactive layer 9 is dissolved by the CMAS compound 8, and a phase 10 of apatite $Ca_2Gd_8(SiO_4)_6O_2$ impervious to the molten CMAS 8 is formed between the reactive layer 9 and the molten CMAS 8. In addition, an anorthite phase $CaAl_2Si_2O_8$ was also produced. This phase is suspended in the molten CMAS 8. The environmental barrier 3 does not show any cracks. Indeed, the cation reservoir allows to form two tight layers in large quantity and thus to limit the penetration depth, compared with the use of a known reactive layer such as $La_2Zr_2O_7$. The modification of the mobility of the CMAS 8 by producing the anorthite secondary phase and the apatite phase thus limits the possibility for the liquid to penetrate the still healthy $Gd_{3.1}Al_{0.9}Ta_{1.7}Ti_{0.5}O_{10.85}$ layer.

The invention claimed is:

1. An aeronautical part, comprising
    a substrate, an environmental barrier and at least one reactive layer,
    the environmental barrier comprising at least one layer selected from a thermally insulating layer, a sublayer suitable for promoting adhesion between the substrate and the thermally insulating layer and a protective layer suitable for protecting the substrate from oxidation and/or corrosion,
    the environmental barrier at least partially covering the substrate,
    the at least one reactive layer being suitable for reacting with at least one CMAS compound selected from a calcium oxide, a magnesium oxide, an aluminum oxide and a silicon oxide,
    the reactive layer at least partially covering the environmental barrier,
    wherein the material of the reactive layer comprises at least one oxide of formula $A'_{4-x}A''_xB'_{2-y}B''_yO_{11-\delta}$, A' being selected from a rare earth, yttrium and scandium, A" being selected from a rare earth, yttrium, scandium and aluminum, B' being selected from tantalum and niobium, B" being selected from tantalum, niobium, zirconium, hafnium, aluminum and cesium, x and y being real numbers between 0 and 2 and $\delta$ being a real number between −1 and 1.

2. The aeronautical part as claimed in claim 1, wherein the oxide predominantly has a cubic lattice in volume.

3. The aeronautical part as claimed in claim 1, wherein the oxide has a rare-earth atomic fraction of between 18% and 24%.

4. The aeronautical part as claimed in claim 1, wherein A' and A" are the same element, A' and A" being selected from a rare earth, scandium and yttrium.

5. The aeronautical part as claimed in claim 1, wherein B' and B" are the same element, B' and B" being selected from tantalum and niobium.

6. The aeronautical part as claimed in claim 1, wherein the reactive layer directly overlies a layer selected from the thermally insulating layer and the protective layer.

7. The aeronautical part as claimed in claim 1, wherein the reactive layer has a thickness of between 5 μm and 500 μm.

8. The part as claimed in claim 1, wherein the reactive layer comprises at least 50% by volume of said oxide.

9. The aeronautical part as claimed in claim 1, wherein the reactive layer also comprises at least one complementary oxide selected from yttriated zirconia, $Al_2O_3$, $Y_2O_3$—$ZrO_2$—$Ta_2O_5$ and an oxide of formula $C_2D_2O_7$, wherein C is selected from a rare earth and yttrium and D is selected from zirconia and silicon.

10. The aeronautical part as claimed in claim 1, wherein the average volume fraction of said oxide in the reactive layer varies with increasing distance from the substrate.

\* \* \* \* \*